Jan. 2, 1951   F. C. MILLER   2,536,385
SPEED REDUCER LUBRICATING MEANS
Filed Aug. 9, 1945
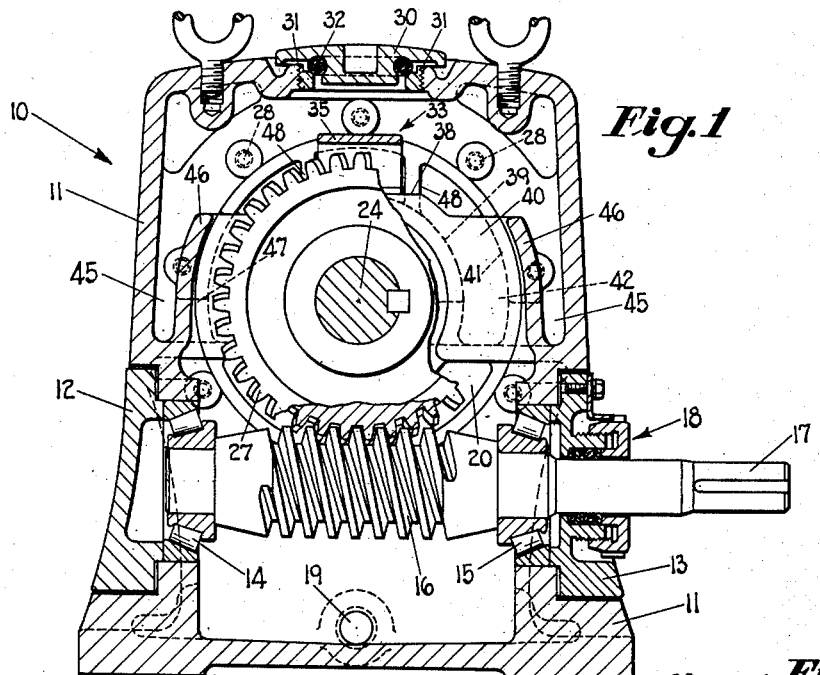
INVENTOR:
FRANK C. MILLER,
BY
ATTY.

UNITED STATES PATENT OFFICE 2,536,385

SPEED REDUCER LUBRICATING MEANS

Frank C. Miller, Worthington, Ohio, assignor, by mesne assignments, to The Jeffrey Manufacturing Company, a corporation of Ohio Application August 9, 1945, Serial No. 609,765

7 Claims. (Cl. 184—11)

This invention relates to a speed reducer, and an object of the invention is to provide such a device with improved lubricating means for certain bearings thereof which insure lubrication of the bearings, regardless of the direction of rotation of the gears thereof.

Another object of the invention is to provide a speed reducer or a casing for a speed reducer, in which shaft supporting bearings are interconnected by lubricant passageways so as to insure lubrication of said bearings.

Other objects of the invention will appear hereinafter, the novel features and combinations being set forth in the appended claims.

In the accompanying drawings;

Fig. 1 is a sectional elevational view of a speed reducer taken through the shaft of the driving worm;

Fig. 2 is a sectional elevational view of a speed reducer taken at right angles to the view of Fig. 1;

Fig. 3 is a combined sectional and elevational view on a reduced scale showing particularly the oil passageways, with most of the working mechanism of the speed reducer eliminated; and Fig. 4 is a perspective view of the oil distributor of the speed reducer.

The speed reducer includes a main frame in the form of a casing or housing 10 which is formed by a main housing casting 11, near the bottom and on opposite walls of which there are removable plates 12 and 13 which are adjacent bearing receiving openings in the main frame casting 11, which openings receive anti-friction roller bearings 14 and 15 which support a substantially horizontal worm 16 formed as an integral part of a drive shaft 17 which extends through a stuffing box 18 formed in the plate 13.

As best seen in Fig. 2 of the drawing, oil or lubricant drain plugs 19 close drain openings formed in the bottom of the casing or housing 10 and one or both of them may be removed to drain the oil or lubricant therefrom. On its two other spaced sides the side walls of the casing or housing 10 include removable plates 20 and 21 which close the large diametrical openings in opposite sides of the casing 11 and which are provided with integral cups which receive and support spaced anti-friction roller bearings 22 and 23, which in turn support a driven shaft 24. The driven shaft 24 has projections which extend through each of the plates 20 and 21 and are keyed to receive gears, sprockets, pulleys or the like.

Oil seals 25 and 26 are also provided in appropriate cups in the plates 20 and 21 and cooperate with the shaft 24 to prevent leakage of oil or lubricant from the casing 10.

Keyed to the center of the shaft 24 is a hub of a worm gear or wheel 27 which meshes with and is driven by the worm 16. The removable plates 20 and 21 are removably attached to the casting 11 by a plurality of peripheral machine screws 28. Adjacent their bottoms and substantially in line with the center of the worm 16, each of the plates 20 and 21 is provided with a drain plug 29, one of which is preferably removed when the casing or housing 10 is filled with oil or lubricant so as to predetermine the level of the lubricant in said casing or housing 10. In other words, the oil is preferably maintained at a level in the housing 10, as determined by the location of the plug 29.

The top of the casing 10 is provided with a breather opening which receives a removable cap 30 preferably provided with breather passageways 31 which are provided with a filter ring 32. This provides for breathing of the speed reducer in response to temperature changes while filtering the air which enters the casing or housing 10.

Since the normal lubricant or oil level in the casing or housing 10 is substantially along the center line of the shaft 17 or worm 16, it is evident that the bearings 14 and 15 will be adequately lubricated since they are at least in part running in oil. Likewise, the teeth of worm 16 will be adequately lubricated and, while rotating, will pick up oil and transfer it to the teeth of gear 27. Gear 27, while rotating, will carry lubricant upwardly, regardless of its direction of rotation and this elevated oil or lubricant will be removed adjacent the top of the gear 27 by a symmetrical one-piece oil distributor 33 (see Fig. 4). The oil distributor 33 is symmetrically arranged so that, regardless of the direction of rotation of the gear 27, its action is substantially the same. Furthermore, it is double in its action for each direction of rotation and acts to scrape oil from the opposite faces of the gear 27 and distribute it laterally thereof in opposite directions to each of the plates 20 and 21 regardless of the direction of rotation of the gear 27.

To this end, the oil distributor 33 includes a pair of scraper or plow edges 34 on each leading edge of a U-shaped yoke 35, the scraper edges 34 being closely adjacent to the opposite faces of the rim of gear 27, as clearly illustrated in Fig. 2 of the drawing, and acting to scrape oil therefrom and deliver it to oppositely extending troughs or chutes 36 of the distributor 33, there being four such chutes 36, one on each side of a pair of dividing partitions 37 which extend laterally in an upright plane from the center of the yoke 35.

It is thus evident that there is a pair of troughs or chutes 36 extending laterally from each side of the gear 27, one pair extending to plate 20, the other pair to plate 21. The bottom plate of each chute 36 rests on a flat ledge 38 formed on each of the plates 20 and 21, the outermost portions of the side walls and end walls of the distributor 33 being cut away or elevated slightly above the adjacent generally cylindrical portion 39 of the plates 20 and 21 so that oil or lubricant can flow freely from the outer portion of each trough or chute 36 onto said generally cylindrical portion 39 of a plate 20 or 21.

The cylindrical portion 39 of each plate 20 and 21 provides guiding lubricant troughs or passageways so that oil or lubricant received thereby can flow downwardly and laterally thereover, preferably in opposite directions or, in other words, to both sides thereof, regardless of which of the two adjacent troughs or chutes 36 is feeding it. To complete the guiding chute the lateral extremities of the cylindrical portion 39 are formed on the outer side by an integral wall of plate 20 or 21 and on the inner side by an upstanding integral plate or wall 40 which connects with an integrally formed end wall 41.

It is evident that the cylindrical portion 39, wall 40 and the walls 41 are all formed as an integral portion of an end plate 20 or 21 and they co-operate to provide an open trough or passageway acting to guide the oil or lubricating material which is received from the distributor 33 and directed downwardly into spaced oil wells 42, there being four such wells 42, one on each side of each bearing receiving cup 43, which receive the bearings 22 and 23, above described.

Each of the plates 20 and 21 is provided with a pair of oil or lubricant passageways 44 (see Fig. 3) which connect the two wells 42 with the cup 43, thus providing for lubrication of the bearing 22 or 23, as the case may be. Since each bearing is thus lubricated from a pair of wells 42, it is obvious that should only one of them receive oil the bearing would still be adequately lubricated.

Furthermore, the wells 42 associated with the plates 20 and 21 on the same side of an upright plane passing through the axis of the shaft 24 are interconnected by a pair of oil passageways 45 formed on opposite sides of the casting 11, so that if for any reason the distributor 33 should distribute oil only to one side of the casing or housing 10 or, in other words, to only one of the plates 20 or 21, the oil would still be distributed from the wells 42 on one of said plates 20 and 21 to the other, thus insuring proper lubrication of both the bearings 22 and 23.

As best seen in Fig. 1 of the drawings, the passageways 45 are open troughs, being formed in part by upwardly and inwardly extending integral partitions 46. As a consequence of this open structure it is possible for some oil to drain from the upper portion of the casing 10 into said troughs or passageways 45 and be delivered to the wells 42. This open trough construction also provides for cleaning out the passageways 45 to remove any sludge or foreign matter which may accumulate over a period of time.

Communication between the passageways 45 and the wells 42 is provided by a short communicating passageway or bore 47 for each well 42, which passageway 47 is formed in plate 20 or 21 adjacent the well 42 and in alignment with a connecting or communicating portion of passageway 45.

The distributor 33 is not rigidly attached to anything, but merely floats so that the plow edges 34 can perform their function without any binding on the gear 27, that is, the distributor 33 is loosely supported in the housing 11 for floating bodily movement in order that it may follow any sideward movement of the gear 27. The support for the distributor 33 is provided by virtue of the fact that opposite sides thereof rest on the ledges 38 of plates 20 and 21. Furthermore, lateral movement of the distributor 33 is prevented since each of its opposite ends projects between a pair of integrally formed abutments or walls 48 formed on the caps or plates 20 and 21. Stated another way, the opposite ends of the distributor 33 are received in recesses which are formed in the plates 20 and 21 which are bound by integral walls 48. Thus, when the distributor 33 is set in place astraddle the gear 27, it is held there while being relatively free to adjust itself so that the scraper or plow edges 34 freely follow the gear 27 without creating undesirable friction.

In the operation of the speed reducer the housing 10 will be filled with oil or other suitable lubricant, preferably to the height of the drain plugs 29. The shaft 17 will be driven by a motor or other driving device, and the worm 16 will drive the worm gear 27 and the shaft 24 in either of reverse directions. When gear 27 is rotating in one direction it will elevate oil in one direction which will be scraped off by a pair of scraper or plow edges 34 on one side of the oil distributor 33 and from reverse faces of the gear 27. This oil will then flow laterally in reverse directions through a pair of the troughs or chutes 36 of distributor 33 and be discharged onto the tops of the oil distributing troughs, ways or chutes formed by the members 38, 39 and 40 of the plates 20 and 21.

The oil will then flow downwardly through these chutes on both sides thereof, but principally to one side, as determined by the pair of troughs or chutes 36 which are receiving the oil. This oil will then be received in wells 42 and will flow through oil passageways 44 to the roller bearings 22 and 23.

If the direction of rotation of the gear 27 is reversed, the other pair of plows 34 and passageways 36 will perform the principal distributing operation, the ultimate result being substantially the same as above described.

The oil is free to flow to wells 42 on opposite sides of the main frame or casing 10 or, in other words, to lubricate both bearings 22 and 23 from oil received primarily by any one of the four wells 42. Furthermore, drainage from the upper portion of opposite side walls of the housing 10 will be received in passageways 45, also aiding in the proper lubrication of the bearings 22 and 23.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A speed reducer adapted for low speed operation in reverse directions including a housing adapted to contain oil in the bottom thereof, reduction gearing mounted in said housing including a horizontal shaft, spaced bearings supporting said shaft on said housing, a gear on said shaft between said bearings having opposite side faces adapted to elevate oil when said gear is rotated, an oil distributor adjacent the top of said gear adapted to wipe oil therefrom, said oil distributor including a yoke straddling said gear for wiping oil from its opposite side faces when said gear is driven in either direction and oppositely extending trough means for delivering oil wiped from the gear to each side thereof, means supporting said oil distributor loosely within said housing for floating bodily movement whereby said oil distributor may move bodily to follow sideward movement of said gear, four oil wells, one at each side of each of said spaced bearings and each adapted to feed oil to its adjacent bearing, guide means above said oil wells for directing oil discharged from said oil distributor into said oil wells, and oil passageway means interconnecting the said wells whereby oil delivered to any one of said wells can flow to a well adjacent the other bearing thereby insuring lubrication of both bearings.

2. A speed reducer adapted for low speed operation in reverse directions including a housing adapted to contain oil in the bottom thereof, reduction gearing mounted in said housing including a horizontal shaft, spaced bearings supporting said shaft on said housing, a gear on said shaft between said bearings having opposite side faces adapted to elevate oil when said gear is rotated, an oil distributor adjacent the top of said gear adapted to wipe oil therefrom, said oil distributor including a yoke straddling said gear for wiping oil from its opposite side faces when said gear is driven in either direction and oppositely extending trough means for delivering oil wiped from the gear to each side thereof, means supporting said oil distributor loosely within said housing for floating bodily movement whereby said oil distributor may move bodily to follow sideward movement of said gear, an oil well adjacent each of said spaced bearings adapted to feed oil thereto, guide means above said oil wells for directing oil discharged from said oil distributor into said oil wells, and oil passageway means interconnecting said wells whereby oil delivered to either well can flow to the other thereby insuring the lubrication of both bearings.

3. A speed reducer adapted for low speed operation in reverse directions including a housing adapted to contain oil in the bottom thereof, reduction gearing mounted in said housing including a horizontal shaft, spaced bearings supporting said shaft on said housing, a gear on said shaft between said bearings having opposite side faces adapted to elevate oil when said gear is rotated, an oil distributor adjacent the top of said gear adapted to wipe oil therefrom and to direct said oil to flow to said bearings, said oil distributor including a yoke straddling said gear for wiping oil from its opposite side faces when said gear is driven in either direction and oppositely extending trough means for delivering oil wiped from the gear to each side thereof, and means supporting said oil distributor loosely within said housing for floating bodily movement whereby said oil distributor may move bodily to follow sideward movement of said gear.

4. In a speed reducer adapted for low speed operation in reverse directions, a housing adapted to contain oil in the bottom thereof, spaced bearings in said housing above the level of the oil therein, a gear between and supported by said bearings having opposite faces adapted to be reversely driven at low speeds and when rotated to elevate oil, a symmetrical oil distributor in said housing adjacent the top of said gear adapted to wipe oil from said gear when said gear is rotated in either direction and to direct said oil to flow to said bearings, said oil distributor including a yoke straddling said gear for wiping oil from its opposite faces, and means supporting said oil distributor loosely in said housing for floating bodily movement whereby said oil distributor can move bodily to follow sideward movement of said gear.

5. In a speed reducer, a housing, spaced bearings in said housing, a gear between and supported by said bearings having opposite faces adapted to carry oil when said gear is rotated, an oil distributor in said housing adapted to wipe oil from said gear when said gear is rotated and to direct said oil to flow to said bearings, said oil distributor including a yoke straddling said gear for wiping oil from its opposite faces, and means supporting said oil distributor in said housing for floating bodily movement whereby said oil distributor can move bodily to follow sideward movement of said gear.

6. In a speed reducer, a housing having means forming spaced side walls and adapted to contain oil in the bottom thereof, a gear in said housing between said spaced side walls adapted when rotated to elevate oil, means in said housing above the level of the oil therein to be lubricated, and an oil distributor in said housing adapted to wipe oil from said gear and direct it to flow to said means to be lubricated, said oil distributor including a yoke straddling said gear for wiping oil therefrom, said spaced housing side walls including spaced recesses loosely supporting opposite sides of said oil distributor whereby said oil distributor is loosely supported in said housing for floating bodily movement.

7. In a speed reducer, a housing adapted to contain oil in the bottom thereof, spaced bearings in said housing above the level of the oil therein, a gear between and supported by said spaced bearings adapted when rotated to elevate oil, an oil distributor in said housing adapted to wipe oil from said gear and direct it in opposite directions to flow to each of said spaced bearings, said oil distributor including a yoke straddling said gear for wiping oil therefrom, and means loosely supporting said oil distributor within said housing for floating bodily movement whereby said oil distributor may move bodily to follow sideward movement of said wheel.

FRANK C. MILLER.

REFERENCES CITED

The following references are of record in the file of this patent:

UNITED STATES PATENTS

| Number | Name | Date |
| --- | --- | --- |
| 895,396 | Allison | Aug. 4, 1908 |
| 1,014,628 | Leiber | Jan. 9, 1912 |
| 1,545,609 | Scholes | July 14, 1925 |
| 1,704,298 | Levine | Mar. 5, 1929 |
| 1,971,781 | Henderson | Aug. 28, 1934 |
| 1,972,911 | Acker | Sept. 11, 1934 |

FOREIGN PATENTS

| Number | Country | Date |
| --- | --- | --- |
| 1,802 | Great Britain | 1902 |
| 159,129 | Switzerland | Mar. 1, 1933 |